United States Patent
Koelzer

[19]

[11] Patent Number: 5,466,053
[45] Date of Patent: Nov. 14, 1995

[54] FULL-FUNCTION VALVE FOR TANDEM TRAILER BRAKE SYSTEM

[75] Inventor: Robert L. Koelzer, Kearney, Mo.

[73] Assignee: Midland Brake, Inc., Kansas City, Mo.

[21] Appl. No.: 304,393

[22] Filed: Sep. 12, 1994

Related U.S. Application Data

[63] Continuation-in-part of Ser. No. 149,287, Nov. 9, 1993, Pat. No. 5,417,479.

[51] Int. Cl.$^6$ ................................................. B60T 13/40
[52] U.S. Cl. ............................ 303/7; 303/71; 303/DIG. 2
[58] Field of Search ............................... 303/2, 7, 14, 28, 303/39–41, 68, 71, 81–83, 86, DIG. 1, DIG. 2

[56] References Cited

U.S. PATENT DOCUMENTS

| | | | |
|---|---|---|---|
| Re. 30,205 | 2/1980 | Carton et al. | 303/7 |
| 1,164,025 | 12/1915 | Snyder . | |
| 4,181,367 | 1/1980 | Herring et al. | 303/7 |
| 4,226,482 | 10/1980 | Stable et al. | 303/82 |
| 4,354,713 | 10/1982 | Edwards | 303/8 |
| 4,593,954 | 6/1986 | Campanini | 303/7 |
| 4,915,456 | 4/1990 | Gross et al. | 303/9 |
| 5,046,786 | 9/1991 | Johnston et al. | 303/7 |
| 5,061,015 | 10/1991 | Cramer et al. | 303/7 |
| 5,236,250 | 8/1993 | Moody et al. | 303/7 |
| 5,322,353 | 6/1994 | Wallestad | 303/7 |

FOREIGN PATENT DOCUMENTS

0387004  12/1990  European Pat. Off. .

OTHER PUBLICATIONS

U.S. patent application Ser. No. 08/149,287 (Wallestad & Koelzer) Filed Nov. 9, 1993.
U.S. patent application Ser. No. 08/149,288 (Wallestad & Billot) Filed Nov. 9, 1993.

Primary Examiner—Robert J. Oberleitner
Assistant Examiner—Alfred Muratori
Attorney, Agent, or Firm—St.Onge Steward Johnston & Reens

[57] ABSTRACT

A full-function brake valve for a tandem trailer is contained within a single housing and provides a boost to the control air signal arriving at the full-function valve so that the control air signal can be delivered to a second trailer full-function valve without degradation of the control air signal. The signal boost function is provided by an aperture in the piston of the relay valve that connects the control air inlet to the supply air, to cause the supply air pressure to boost the control air signal.

13 Claims, 3 Drawing Sheets

FULL-FUNCTION VALVE FOR TANDEM TRAILER BRAKE SYSTEM

This application is a continuation-in-part of U.S. patent application Ser. No. 08/149,287, filed Nov. 9, 1993, now U.S. Pat. No. 5,417,479 in the names of Steven D. Wallestad and Robert L. Koelzer, and entitled: "Full-Function Valve For Heavy Duty Semi-Trailer Brake System".

BACKGROUND OF THE INVENTION

1. Field of the Invention

This invention relates to an improved full-function brake valve for use in fluid braking systems used on the semi-trailers of highway tractor-trailer vehicles, and in particular, tandem trailer braking systems.

2. Discussion of the Prior Art

To meet all of the emergency and service requirements for highway tractor-trailer combinations, while meeting all of the pertinent governmental regulations, including Federal Regulation FMVSS 121 (Docket 90-3, Notice 2), the trucking industry has resorted to a number of trailer brake valve arrangements which have led to complexity, high costs, installation and maintenance difficulties and related problems.

FMVSS 121 is an important safety standard that applies to highway tractor-trailer vehicles; it requires that the spring brakes, which are spring loaded to engage the brake drums when the braking system air pressure drops below the operating pressure necessary to operate the service brakes, become engaged within certain specified time periods. This provides emergency braking when the service brakes become inoperative.

In a typical semi-trailer braking system, a spring brake control valve may be employed to supply pressurized air to the spring brake chambers to release the spring brakes, and also to exhaust air from the spring brake chambers when the spring brakes are to be again applied. The brake system, however, must be designed so that the spring brakes are not released prematurely, that is, prior to pressurization of the reservoir for operating the service brakes. A full-function valve operative to meet these desirable functions has been disclosed in U.S. Pat. No. 5,417,479, issued May 23, 1995, in the names of Steven D. Wallestad and Robert L. Koelzer, and entitled: "Full-Function Valve For Heavy Duty Semi-Trailer Brake System", the disclosure of which is hereby incorporated by reference.

It has been found that where a tandem trailer is employed, i.e., where there are two (or more) trailers to be towed by a tractor, that an added relay valve is needed to boost or enhance the control air signal arriving at the first trailer so that the control air signal is provided to the second trailer at about the same signal strength as it arrives at the first trailer. This relay valve is typically incorporated into the control air line after connection to the control air relay valve that operates the service brakes in the first trailer. In the absence of such an added relay valve, the control air signal will be seriously degraded when it reaches the second trailer. This can lead to weak or uneven application of the brakes, potentially causing uneven brake wear, poor braking stability, and even potential vehicle jackknifing.

It would be desirable if the signal boosting function of the relay valves used heretofore to boost the control air signal could be incorporated into a single full-function valve that also includes a relay valve for activating the service brakes and a spring brake control valve for controlling release and engagement of the spring brakes.

SUMMARY OF THE INVENTION

It is an object of the present invention to provide within a single valve envelope an improved full-function brake valve for heavy-duty highway trailers which performs all of the required functions of a tractor trailer braking system and otherwise meets all of the requirements of the aforementioned Federal Regulation.

It is another object to provide a full-function brake valve system for heavy-duty highway semi-trailers which can boost a control air signal in a tandem trailer system to prevent control air signal degradation at the second trailer.

The invention comprises the addition of a passageway in the relay valve of a full-function valve to provide fluid communication between a control air inlet of the full-function valve and a supply air inlet of the full-function valve when pressurized control air is supplied to the relay valve, to thereby provide supply air to the control air line to boost the pressure of the control air signal. This permits that control signal to be operative at the second trailer of a tandem trailer at the same signal strength as the signal strength at the first trailer.

Preferably, a second full-function valve is provided in fluid communication with the control air inlet of the first full-function valve to operate the braking system of a second trailer. Preferably, a quick release valve is also provided in fluid communication with the service brake outlet in a brake line connecting the service brake outlet to a service brake chamber.

Other objects, aspects and features of the present invention in addition to those mentioned above will be pointed out in or will be understood from the following detailed description provided in conjunction with the accompanying drawings.

BRIEF DESCRIPTION OF THE DRAWINGS

The present invention may be more clearly understood from the following description of a specific and preferred embodiment read in conjunction with the accompanying schematic and detailed drawings; wherein.

DETAILED DESCRIPTION OF DRAWINGS

Figure 1:
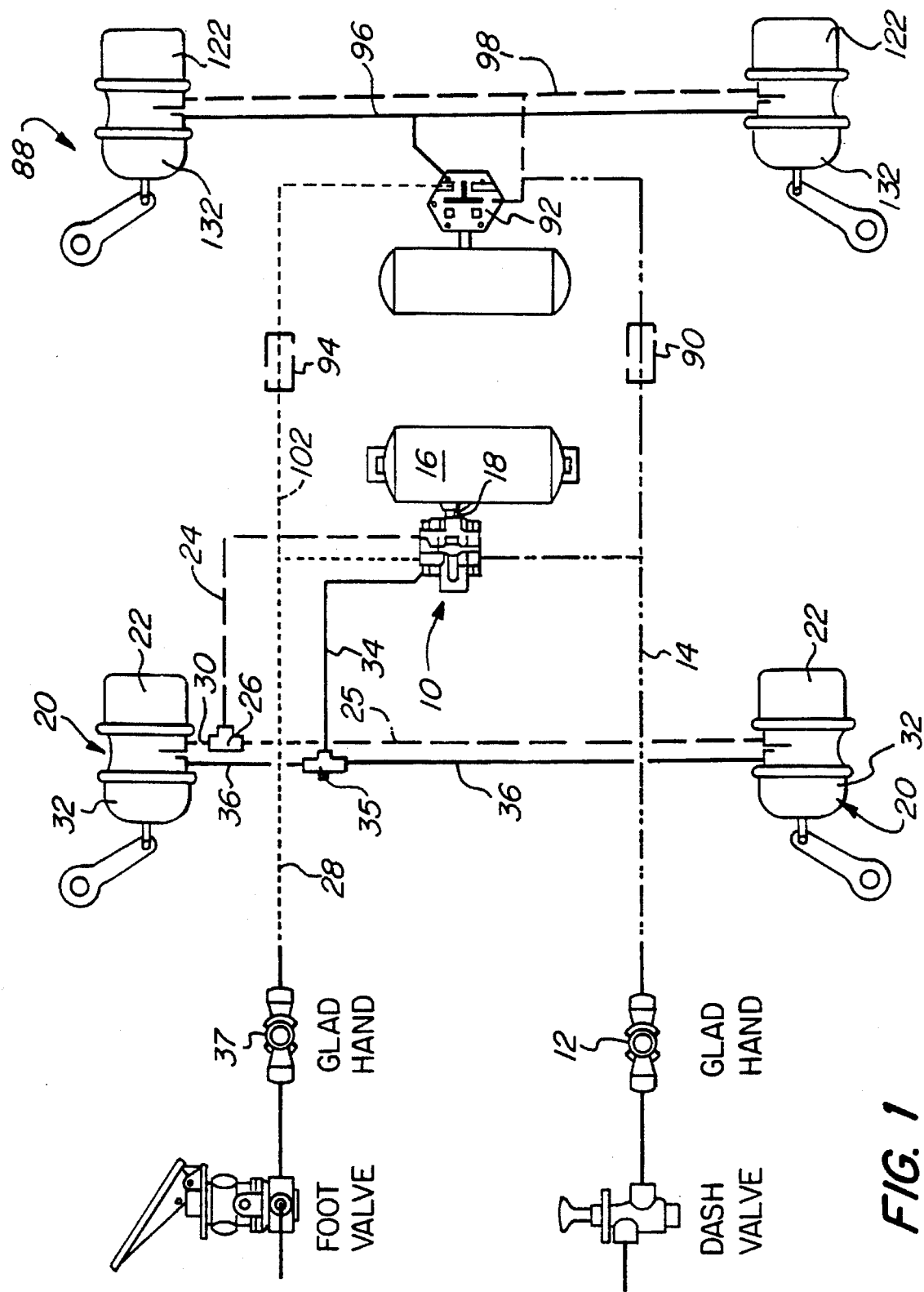
FIG. 1 is an overall schematic of a tandem trailer brake system using a full-function valve in accordance with the present invention.

Referring to FIG. 1, the schematic drawing represents a semi-trailer tandem brake system including a unitary full-function valve 10 in accordance with the present invention. Pressurized supply air, typically at about 125 psig, is received into the system from a supply source (not shown) of the tractor-trailer combination via trailer gladhand connector 12 and is communicated to full-function valve 10 via line 14.

The pressurized air is directed by valve 10 to reservoir tank 16 via line 18. Pressurized air is also directed by full-function valve 10 to the brake actuators 20, the spring brake chambers 22 thereof being in fluid communication with full-function valve 10 via lines 24, 25 and 30, and the service brake chambers 32 of actuators 20 being in fluid communication with full-function valve 10 via line 34, quick release valve 35, and lines 36. Quick release valve 35 permits faster release times in a tandem trailer circuit where there may be a delay in brake release where there are long passageways needed to vent the brakes.

Control air from the tractor for controlling the service brakes is received via gladhand 37 and communicated to full-function valve 10 via line 28.

The pressurized air which fills the reservoir 16 and actuates the spring and service brakes is referred to herein as "supply air", and the pressurized air which controls the full-function valve 10 is referred to herein as "control air".

The second trailer has a braking system 88 connected to the first trailer's braking system by gladhand couplings 90 and 94. Line 14 is connected via gladhand coupling 90 to a second full-function valve 92. Full-function valve 92 is generally similar to full-function valve 10 except it need not have the signal boosting function hereafter described. Control air line 28 is also connected via gladhand coupling 94 to full-function valve 92. Full-function valve 92 is operable upon receipt of a control air signal to supply the second trailer's service brake chambers 132 with air pressure via line 96 to operate the service brakes. Full-function valve 92 is also operable to supply spring brake chambers 122 to release the spring brakes when the supply air pressure supplied via glad hand coupling 90 is sufficient to release said spring brakes.

It should be understood that the drawings are not necessarily to exact scale and that certain aspects of the embodiments, particularly the functional schematics are illustrated by graphic symbols, schematic representations and fragmentary views. It should be also understood when referring to physical relationships of components by terms such as "upper", "lower", "upward", "downward", "vertical", "horizontal", "left", "right" or the like, such terms usually have reference to the orientation depicted in the drawings. Actual embodiments or installations thereof may differ, depending upon the particular semi-trailer for which the braking system is designed. It should also be understood that the term "passageway" is not necessarily limited to a tubular path or other regularly-shaped passage but also encompasses fluid communicating spaces, chambers and the like.

In these detailed descriptions of the full-function valve 10 in FIGS. 1–5, the same reference numerals are used so that the respective descriptions can be more readily related and understood.

Figure 2:
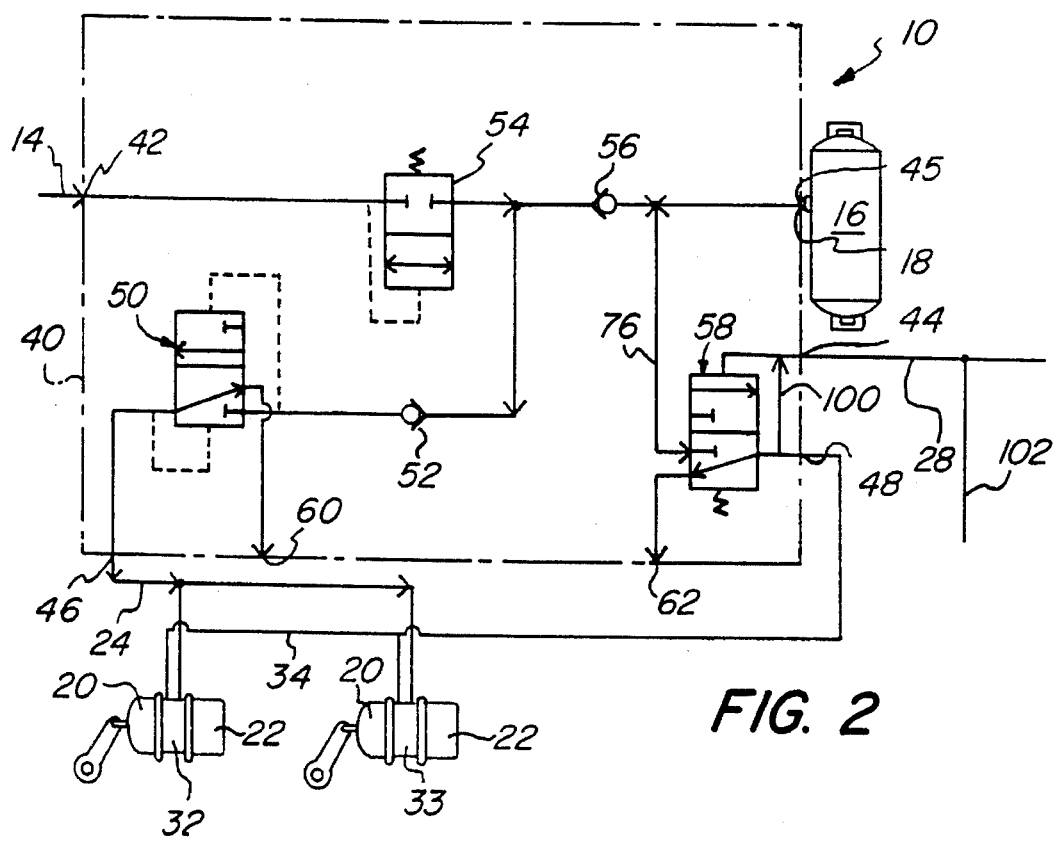
FIG. 2 is a functional schematic of the brake system with a full-function valve in accordance with the invention showing the valve in an "at rest" position.
Figure 3:
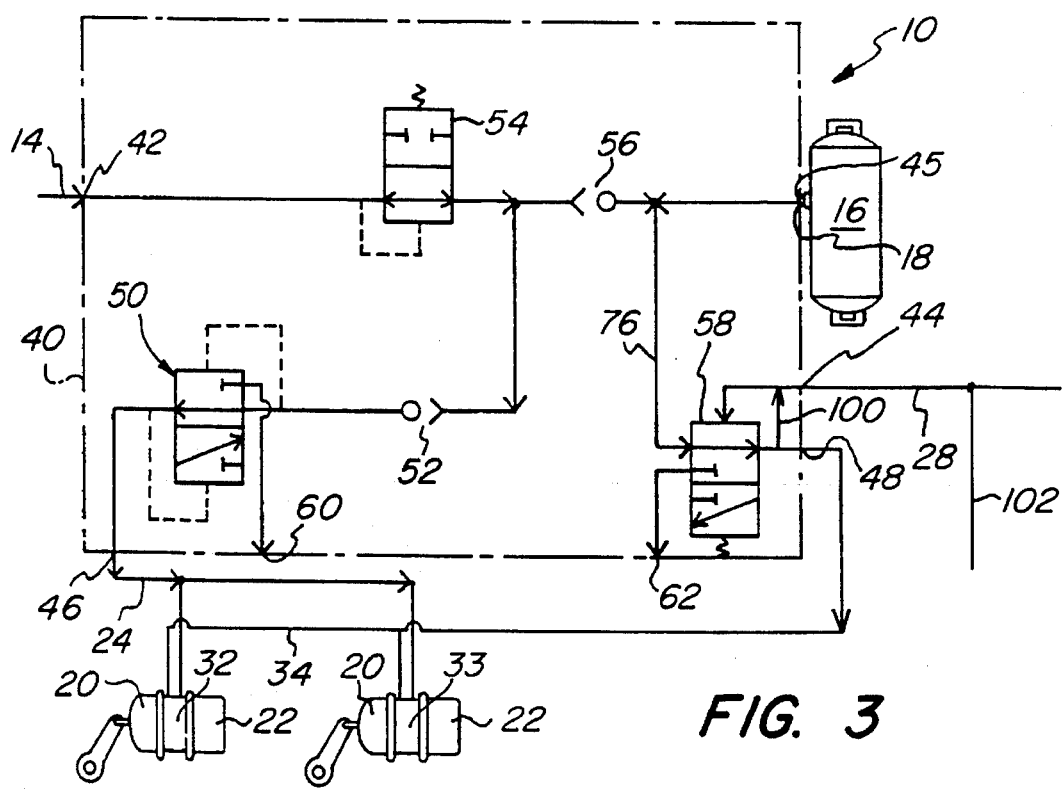
FIG. 3 is the schematic of FIG. 2 showing the full-function valve in an actuated position.

Referring to FIGS. 2–5, unitary full-function valve 10 in a trailer brake system is shown. In FIGS. 2 and 3, the valve 10 is shown schematically; in FIGS. 4 and 5, a physical embodiment is shown.

Supply air line 14 is connected to housing 40 of full-function valve 10 at supply air inlet 42. Control air line 38 is connected to valve housing 40 at control air inlet 44. Line 18 to reservoir 16 is connected to valve housing 40 at reservoir outlet 45. Line 24 to the spring brake chambers 22 is connected to valve housing 40 at spring brake outlet 46. Line 34 to the service brake chambers 32 is connected to housing 40 at service brake outlet 48.

Unitary full-function valve 10 houses within body 40 a plurality of valve assemblies, namely, quick release valve 50, first check valve 52, biased pressure protection valve 54, reservoir check valve 56, and relay valve 58.

Relay valve 58 has a passageway 100 to provide fluid communication between control air inlet 44 and supply air inlet 14 when pressurized control air is supplied to the relay valve 58, to thereby feed supply air to the control air line 28 to boost the pressure of the control air signal as it is transferred via line 102 to the second full-function valve 92 associated with the second trailer. This permits the control air signal to be operative at the second trailer of a tandem trailer at the same signal strength as the signal strength at the first trailer.

Figure 4:
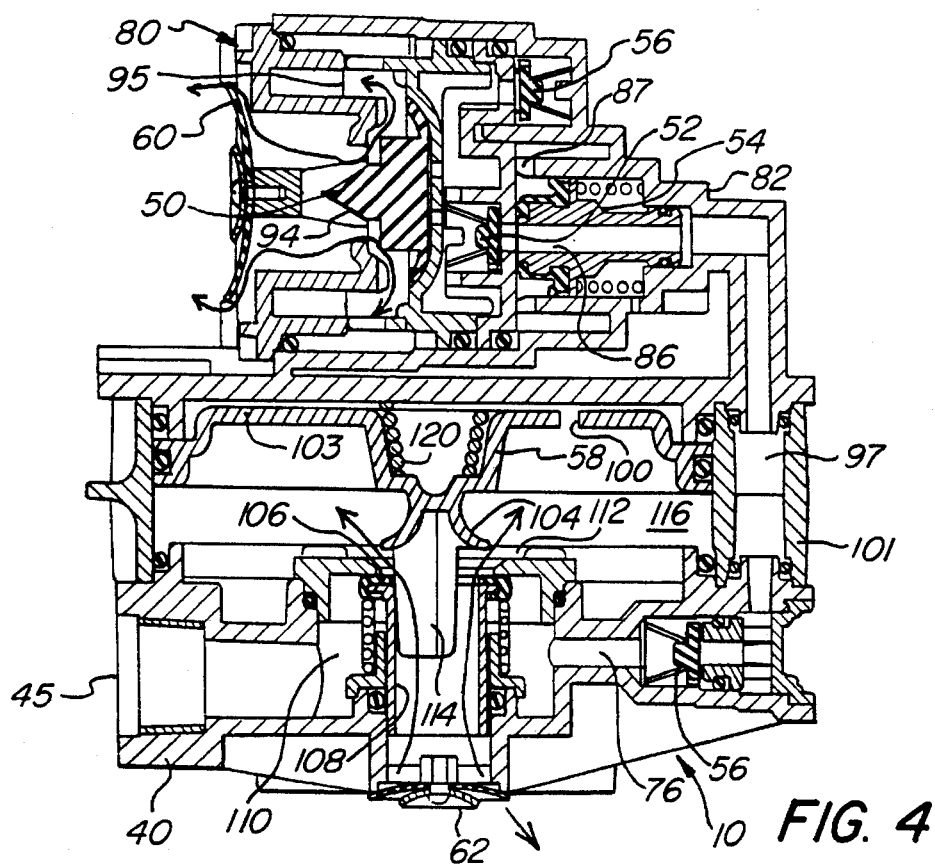
FIG. 4 is a cross-sectional elevational views of an embodiment of a full-function valve in accordance with the invention showing the valve in an "at rest" position.

Referring now to FIGS. 2 and 4, service brake chambers 32 are vented to the atmosphere. Spring brakes 22 are also vented to the atmosphere and are therefore applied. Supply line 14, control air line 28, reservoir line 18, spring brake chamber line 24 and service brake chamber line 34 are all at atmospheric pressure.

The spring brake exhaust outlet 60 in housing 40 and the service brake exhaust outlet 62 in housing 40 vent the braking system so that the spring brakes are engaged. In the at-rest position, spring brake line 24, which is attached to spring brake outlet 46 of valve housing 40, is vented by the quick release valve 50 to exhaust port 60, whereby the spring brake chambers are vented to the atmosphere so that the spring brakes are fully applied. The service brake line 34, which is attached to service brake outlet 48 of valve body 40, is vented by relay valve 58 to exhaust port 62 so that the service brakes are not operable. It is to be appreciated that exhaust ports 60 and 62 may comprise the same physical port if so desired.

Figure 5:
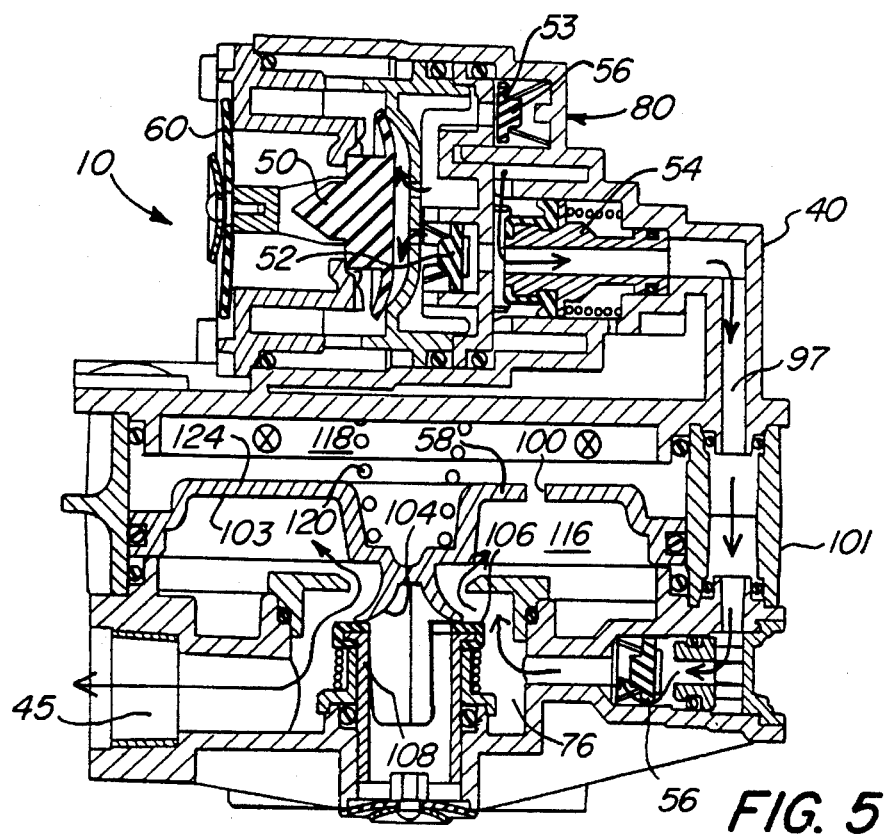
FIG. 5 is the full-function valve of FIG. 4 showing the valve in an actuated position.

Referring now to FIGS. 2–5, and particularly to the physical embodiment of a valve 10 in FIGS. 4 and 5, the supply air inlet 42, control air inlet 44, two spring brake outlets 46, and spring brake exhaust outlet 60 are located in upper section 80 of valve 10.

Pressure protection valve 54 is located in the upper section 80 and preferably comprises a spring biased hollow piston 82 that has a sealing means such as a molded rubber seat 84 at one end that seats against a valve seat such as wall 86 to prevent fluid communication from supply air inlet 42 into the valve 10 until the supply air pressure is sufficient to open pressure protection valve 54. Supply air entering supply air inlet 42 enters chamber 87 and opens pressure protection valve 54 at a predetermined pressure, preferably about 70 psig.

First check valve 52 is located in upper section 80 directly across wall 86 from pressure protection valve 54 and through passageways is in fluid communication with adjacent quick release valve 50. Quick release valve 50 preferably comprises a flexible rubber diaphragm having a flange and a body that fits into and seals against a sealing seat opposite from communicating passageways leading from first check valve 52. Passageway 95 communicates with spring brake outlets 46.

A passageway 97 leads from pressure protection valve 54 down into a lower section 101 of valve 10. Lower section 101 comprises a housing for relay valve 58, and includes the reservoir check valve 56.

Check valves 52 and 56 are preferably all molded rubber check valves that will open when inlet side pressure exceeds outlet side pressure, but are normally biased to be closed. Other types of check valve, including conventional ball check valves may also be used in accordance with the invention.

Relay valve 58 comprises a valve piston 103 having a central flange 104 sealable against a lip 106 of a tubular core 108. Core 108 is located in a passageway 110 between the reservoir check valve 56 and reservoir outlet 45. Core 108 is spring biased to normally seal core lip 106 against a partition 112 so that passageway 110 is separated from a passageway 114 connecting service brake exhaust 62 to service brakes via chamber 116.

The passageway 100 connects the chamber 118 above piston 103 with the chamber 116 when control air is supplied to chamber 118 as shown in FIG. 5. A spring 120 biases piston 103 towards core 108.

Referring now particularly to FIGS. 3 and 5, pressurized control air is supplied to chamber 118 at an upper face 121 of valve piston 103 to cause valve piston 103 and the central flange 104 to move downwardly to press against the core 108 to depress core 108 away from partition 112 thereby closing the communicating passageways between the service brake outlet 48 (not shown) and the service brake exhaust 62 and to open communicating passageways from the reservoir outlet 45 and the reservoir check valve 56 to the service brake chambers 32 via the service brake outlet 48 to thereby actuate the service brakes.

In FIGS. 3 and 5, the control air signal received via line 28 to chamber 118 is boosted by a feedback from the supply air line 14 via passageway 100. Passageway 100 may constitute an aperture or orifice sized to provide the desired control air boost to the second trailer.

FIGS. 3 and 5 also show full-function valve 10 when the pressure of the supply air in line 14 and supply air inlet 42 and the internal passageways has increased above a first predetermined pressure, typically about 70 psig. In such case, the biased pressure protection valve 54 and first check valve 52, and reservoir check valve 56 are open. Pressurized air flows into spring brake chambers 22 via one-way check valve 52, quick release valve 50, port 46 and lines 24, 25 and 30. Pressurized air is delivered to reservoir 16 via one way check valve 56.

The spring brakes will release when the pressure in spring brake chambers 22 reaches a predetermined release pressure, which is typically between about 45–70 psig. When the air pressure in the spring brake chambers equals the supply air pressure, one-way check valve 52 will close, retaining the pressure in spring brake chambers 22. This will isolate the pressure in the spring brake chambers 22 from the variations in air pressure in the reservoir portions of the trailer brake system. This will also prevent the pressurized air in the spring brake chambers 22 from escaping in the event of a failure of reservoir 16 or associated lines.

Service brake control air is supplied via line 28 and control air inlet 44 to the piston 103 of relay valve 58. As shown, the valve 58 shifts to communicate pressurized air from reservoir 16 (and supply air under some circumstances) to the service brake chambers 32 via line 18, port 45, passageway 76, valve 58, port 48 and line 34. This results in application of the trailer service brakes in a known manner.

Full-function valve 10 thus provides a control signal boosting function in an integral package, a feature not heretofore known in the art, and provides an improvement over prior art devices in the field.

I claim:

1. In a full-function valve, comprising: a valve housing having a plurality of ports therein, said ports comprising a supply air inlet, a control air inlet, at least one spring brake outlet, at least one service brake outlet, a reservoir outlet, a spring brake exhaust, and a service brake exhaust; said ports extending through an outer wall of said housing; a pressure protection valve in fluid communication with a passageway connected to said supply air inlet, said pressure protection valve being openable at a selected supply air pressure to supply said reservoir outlet; a spring brake quick release valve having a spring brake pressurizing mode when a pressure at an inlet side thereof is sufficient to open said valve to provide fluid communication between said supply air inlet with said spring brake outlet, said quick release valve having an exhaust mode when a pressure at an inlet side thereof is less than a pressure required to open said quick release valve to provide fluid communication between said spring brake outlet with said spring brake exhaust; and a relay valve in fluid communication with said control air inlet, said relay valve being normally located to provide fluid communication between said service brake outlet and said service brake exhaust, and being operable when pressurized control air is supplied thereto to provide fluid communication between said reservoir and said service brake outlet, said relay valve including a valve piston having a central flange sealable against a lip of a tubular core, said core located in a passageway between said supply air inlet and said reservoir outlet, said core being spring biased to normally seal said core lip against a partition wherein said passageway from said supply air inlet to said reservoir outlet is separated from a passageway for connecting to said service brake outlet, and wherein pressurized control air is supplied to an upper face of said valve piston to cause said valve piston and central flange to move downwardly to press against said tubular core to depress said core away from said partition to close the normal connection between the service brake outlet and the service brake exhaust and to open a passageway connecting said reservoir outlet to a service brake chamber through said opened passageway to actuate a service brake; the improvement comprising:

an aperture in said relay valve piston providing fluid communication between said upper face of said valve piston and said passageway connecting said reservoir outlet to a service brake chamber, whereby pressurized supply air in said passageway is supplied to said upper face of said relay valve piston, to thereby boost the pressure of said control air.

2. In a full-function valve in accordance with claim 1, further comprising an opposing bias spring affixed to said valve piston to bias said valve piston to be pressed against said core.

3. A combination comprising a first full-function valve in accordance with claim 1, and further comprising a second full-function valve in fluid communication with said control air inlet of said first full-function valve.

4. In a full-function valve in accordance with claim 1, further comprising a second quick release valve in fluid communication with said service brake outlet in a brake line connecting said service brake outlet to said service brake chamber.

5. In a full-function valve, comprising: a valve housing having a plurality of ports therein, said ports comprising a supply air inlet, a control air inlet, at least one spring brake outlet, at least one service brake outlet, a reservoir outlet, a spring brake exhaust, and a service brake exhaust; said ports extending through an outer wall of said housing; a pressure protection valve in fluid communication with a passageway connected to said supply air inlet, said pressure protection valve being openable at a selected supply air pressure to provide fluid communication between said supply air inlet with a first check valve and a reservoir check valve; a spring brake quick release valve having a spring brake pressurizing mode when a pressure at an inlet side thereof sufficient to open said valve to provide fluid communication between said supply air inlet with said spring brake outlet, said quick release valve having an exhaust mode when a pressure at an inlet side thereof is less than a pressure required to open said quick release valve to provide fluid communication between said spring brake outlet with said spring brake exhaust; and a relay valve in fluid communication with said control air inlet, said relay valve being normally located to provide fluid communication between said service brake outlet and said service brake exhaust, and being operable when pressurized control air is supplied thereto to provide fluid communication between said reservoir and said service brake outlet; the improvement comprising:

a passageway in said relay valve providing fluid communication between said control air inlet and said supply air service air outlet when pressurized control air is supplied to said relay valve, to thereby feed supply air to said control air inlet to boost the pressure of said control air.

6. In a full-function valve in accordance with claim 5, wherein said relay valve comprises a valve piston having a central flange sealable against a lip of a tubular core, said core located in a passageway between said supply air inlet and said reservoir outlet, said core being spring biased to normally seal said core lip against a partition wherein said passageway from said supply air inlet to said reservoir outlet is separated from a passageway for connecting to said service brake outlet, and wherein pressurized control air is supplied to an upper face of said valve piston to cause said valve piston and central flange to move downwardly to press against said tubular core to depress said core away from said partition to close the normal connection between the service brake outlet and the service brake exhaust and to open a passageway connecting said reservoir outlet to a service brake chamber through said opened passageway to actuate a service brake, and wherein said passageway in said relay valve comprises an aperture in said valve piston.

7. In a full-function valve in accordance with claim 6, further comprising an opposing bias spring affixed to said valve piston to bias said valve piston to be pressed against said core.

8. A combination comprising a first full-function valve in accordance with claim 5, and further comprising a second full-function valve in fluid communication with said control air inlet of said first full-function valve.

9. In a full-function valve in accordance with claim 5, further comprising a second quick release valve in fluid communication with said service brake outlet in a brake line connecting said service brake outlet to a service brake chamber.

10. In a full-function valve, comprising: a valve housing having a plurality of ports therein, said ports comprising a supply air inlet, a control air inlet, at least one spring brake outlet, at least one service brake outlet, a reservoir outlet, a spring brake exhaust, and a service brake exhaust; said ports extending through an outer wall of said housing; a pressure protection valve in fluid communication with a passageway connected to said supply air inlet, said pressure protection valve being openable at a selected supply air pressure to provide fluid communication between said supply air inlet with a first check valve and a reservoir check valve; a spring brake quick release valve having a spring brake pressurizing mode when a pressure at an inlet side thereof sufficient to open said valve to provide fluid communication between said supply air inlet with said spring brake outlet, said quick release valve having an exhaust mode when a pressure at an inlet side thereof is less than a pressure required to open said quick release valve to provide fluid communication between said spring brake outlet with said spring brake exhaust; and a relay valve in fluid communication with said control air inlet, said relay valve being normally located to provide fluid communication between said service brake outlet and said service brake exhaust, and being operable when pressurized control air is supplied thereto to provide fluid communication between said reservoir and said service brake outlet; the improvement comprising:

a passageway providing fluid communication between said control air inlet and said supply air service air outlet when pressurized control air is supplied to said relay valve, to thereby feed supply air to said control air inlet to boost the pressure of said control air.

11. In a full-function valve in accordance with claim 10, wherein said passageway comprises an aperture in a piston.

12. In a full-function valve in accordance with claim 10, further comprising an opposing bias spring affixed to a valve piston to bias said valve piston to be pressed against a core.

13. A combination comprising a first full-function valve in accordance with claim 10, and further comprising a second full-function valve in fluid communication with said control air inlet of said first full-function valve.

* * * * *